Sept. 24, 1935.  R. D. McELHANY ET AL  2,015,081
HOSE COUPLING
Filed June 1, 1933  2 Sheets-Sheet 1

INVENTORS
Robert D. McElhany and James Borroman
BY Conrad A. Dietrich
their ATTORNEY Sept. 24, 1935.      R. D. McELHANY ET AL      2,015,081
HOSE COUPLING
Filed June 1, 1933      2 Sheets-Sheet 2
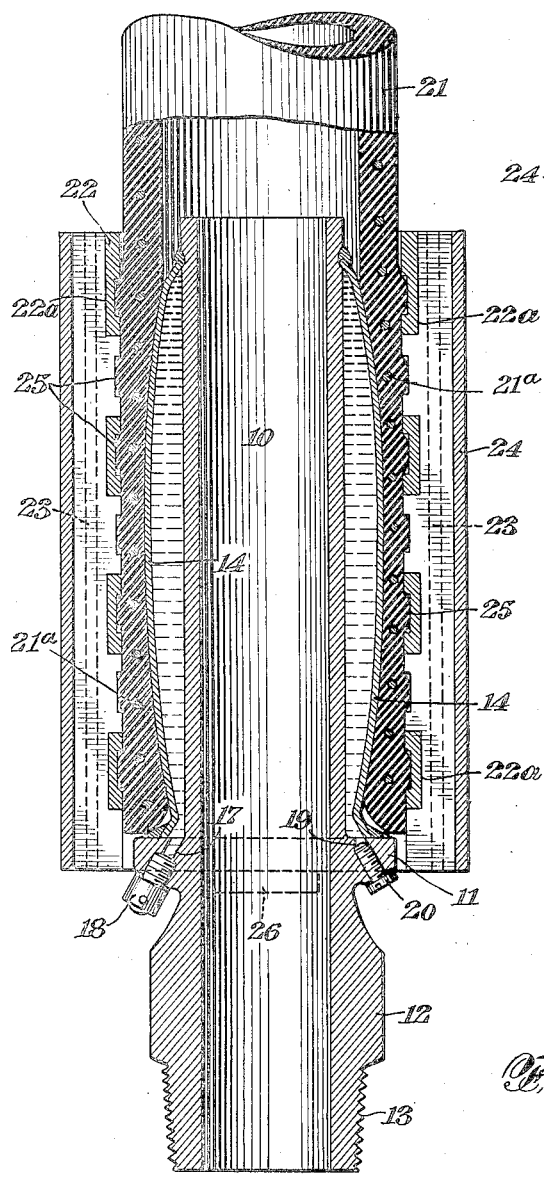
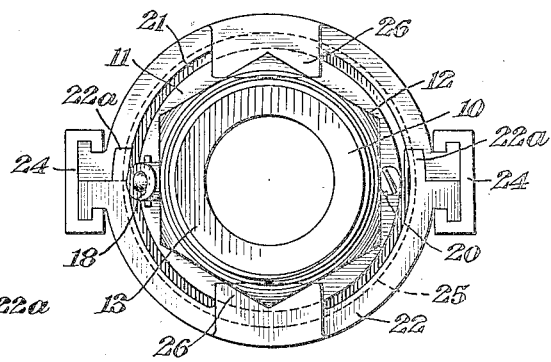
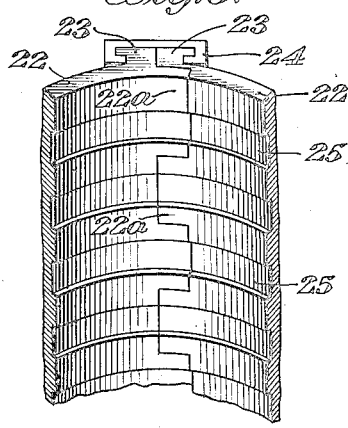
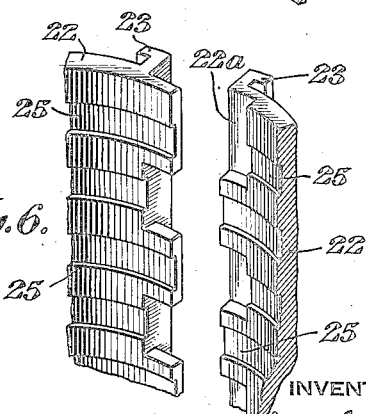

Patented Sept. 24, 1935

2,015,081

UNITED STATES PATENT OFFICE 2,015,081

HOSE COUPLING

Robert D. McElhany and James Borrowman, Beacon, N. Y.

Application June 1, 1933, Serial No. 673,809

16 Claims. (Cl. 285—84)

Our invention relates to improvements in methods and means for connecting hose sections together, or for connecting the end of a hose to a nozzle, attachment or other device.

Further, said invention has for its object to provide a hose coupling which will effectively secure together adjoining ends of hose sections, and form a fluid-tight joint between the same.

Further, said invention has for its object to provide a hose coupling which will form a fluid tight joint between the end of the hose and the coupling member without causing the hose to become distorted or crimped.

Further, said invention has for its object to produce a hose coupling in which the end of the hose to be joined is compressed by pressure exerted outwardly against a circumferential clamp, and thereafter held to such compressed condition.

Further, said invention has for its object to provide a hose coupling in which the end of the hose is secured to and within a clamping member by means of a yielding or deformable member on a portion of the device extending into the hose end, and which latter is forced outwardly by pressure produced between said deformable member and the portion of the device extending into the hose end.

Other objects will in part be obvious and in part be pointed out hereinafter.

To the attainment of the aforesaid objects and ends our invention consists in the novel features of construction, and in the combination, connection, and arrangement of parts hereinafter more fully described and then pointed out in the claims.

In the accompanying drawings wherein like numerals of reference indicate like parts—

Fig. 3 is a similar view showing the hose fully secured therein;

Fig. 4 is a bottom view;

Fig. 5 is a detail perspective view showing the interengaging edges of the clamping members, and Fig. 6 is a similar view showing the interengaging edges of said clamping members in separated relation.

Figure 1:
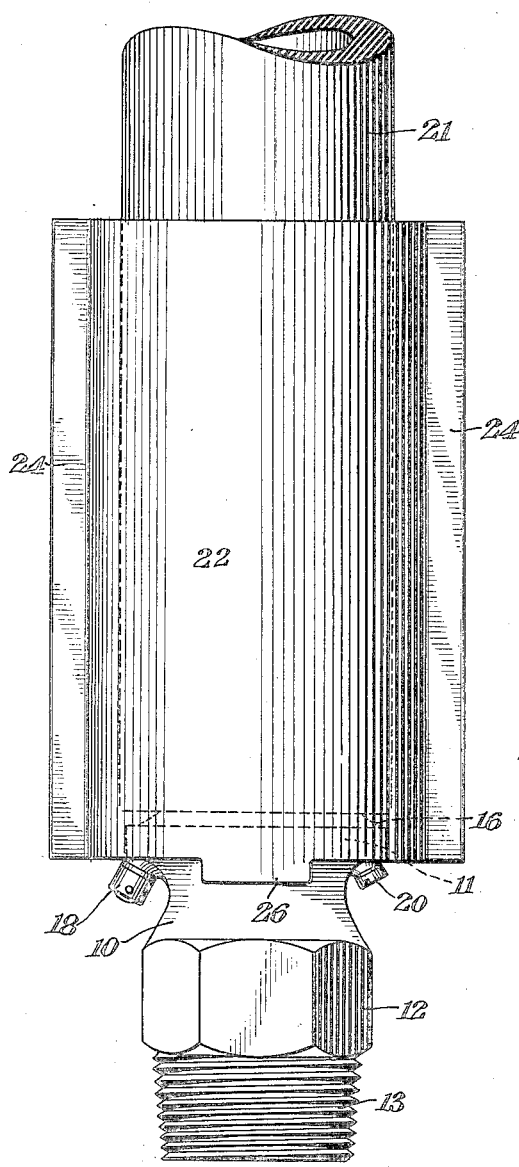
Figure 1 is a side elevation showing one form of hose coupling constructed according to, and embodying our said invention.
Figure 2:
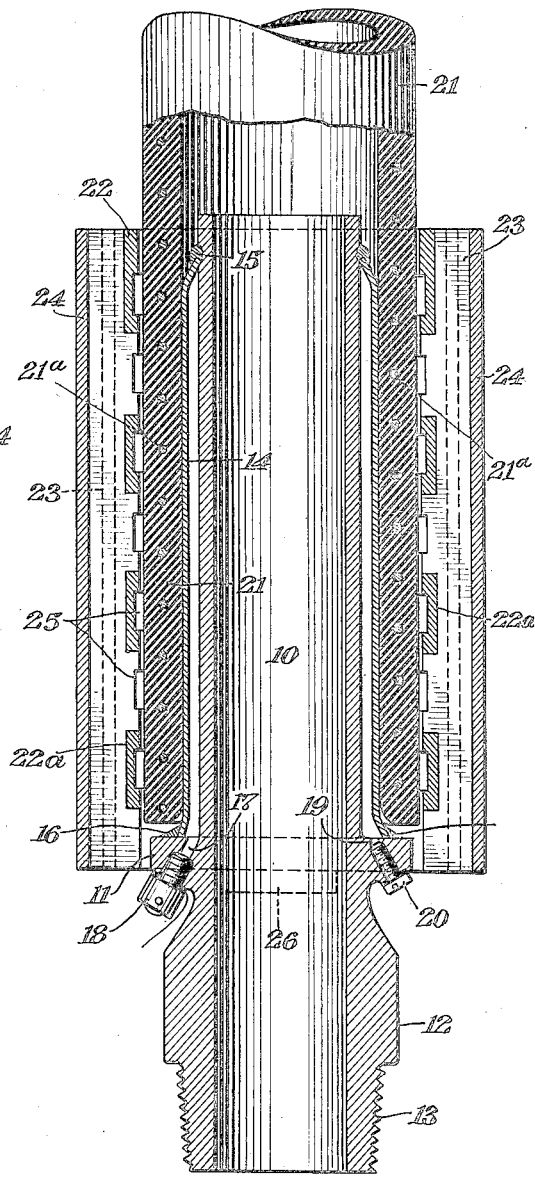
Fig. 2 is a central section showing the end of a hose in position thereon.

In the accompanying drawings 10 designates a tubular coupling member made of cast metal having an annular collar 11 adjacent to one of its ends and a nut 12 below said collar both formed integrally with said tubular coupling member. The end of said coupling member, below said nut 12 is screw threaded at 13.

14 denotes a sleeve or hollow cylindrical wall member of larger diameter than said coupling member 10 and disposed thereon with its lower end engaging the upper side of the collar 11. The sleeve or wall member 14 is preferably made of copper, soft steel or other suitable metal or alloy capable of being deformed under pressure, and of retaining its deformed shape. The upper end 15 of the sleeve 14 is turned inwardly and is seated in an annular recess in the tubular member 10, and the lower end of said sleeve 14 is flared outwardly at 16 and engages the upper side of the collar 11. Both the upper end 15 and the flared lower end 16 of said sleeve 14 are welded, brazed or otherwise secured to the tubular member 10 to form a fluid-tight connection therewith. The said parts when united serve to form an annular, double-walled receptacle 10<sup>a</sup> at one end of said coupling member 10 adapted to receive the end of a hose.

The collar 11 is provided with a screw-threaded passage 17 adapted to receive the nozzle of a hose or pipe of a suitable force pump, not shown. The passage 17 communicates with the space between the tubular coupling member 10 and the sleeve 14, forming the hollow or double-walled end portion of the coupling, through which passage a suitable liquid such as oil or a heavy grease may be forced into said space by a pump in order to cause the wall portion 14 to become distended, as shown by full lines at Fig. 3. When the amount of liquid required to fully distend the wall member has been introduced, the passage 17 is sealed by the screw-plug 18. To permit of the escape of air while the liquid is being forced into the double-walled receptacle 10<sup>a</sup>, the collar 11 is provided with an air vent 19 which communicates with the interior of said receptacle, and is provided with a screw plug 20 for sealing the same.

21 denotes the end of a high pressure hose which is made of heavy rubber having one or more spiral reinforcements 21<sup>a</sup>. The said end 21 is disposed upon the tubular member 10 and closely embraces the wall-member 14 thereof.

The end of the hose is closely embraced by a clamping device comprising two semi-cylindrical members 22 having dentated, interengaging, longitudinal edges 22<sup>a</sup> terminating in conforming longitudinally grooved ribs 23 adapted to receive sliding keys 24 in the form of channel members, which serve to hold the two clamping members 22 secured together and in contact with the outer surface of the hose end 21 without unduly compressing the same.

The inner sides of the clamping members 22 are provided with a series of semi-circular horizontal grooves 25 whose ends register with the corresponding grooves of the cooperating clamping member 22, and each clamping member 22 is provided at its lower edge with an inwardly-extending projection 26 adapted to engage with the underside of the collar 11 of the tubular member 10 to hold the parts duly in position until finally secured by the expansion of the wall member 14, as hereinafter more fully described.

To secure the end of a hose 21 to the tubular member 10, the double-walled receptacle 10a, of the tubular member 10 is inserted into the end of the hose 21, as shown at Fig. 3, and the clamping members 22 disposed over the hose with their edges 22a in interengaging relation, and the projections 26 engaging the collar 11 of the tubular coupling member 10. The keys 24 are then slipped into engagement with grooved ribs 23 of the clamping members 22. Hereupon the plugs 18 and 20 sealing the passages 17 and 19, respectively, in the collar 11, are removed and the nozzle 27 of a hose 28 extending from a pump 29 secured in the threaded portion of the passage 17, and a suitable non-elastic fluid, preferably heavy oil or grease forced into the space between the tubular member 10 and the outer wall portion 14 thereof until said space is completely filled with said fluid, and all air forced therefrom through the air passage 19. As soon as the oil or grease appears in the passage 19 the screw plug 20 is again secured in said passage to tightly seal the same. The operation of the pump 9 is then continued, and the liquid forced under pressure into the space between the tubular wall member 10 and the distensible wall portion 14 thereof until the latter becomes distended and deformed to about the extent shown at Fig. 3, and the portion of the hose 21 between the outer side of the wall portion 14 and the inner sides of the clamping member 22 forced outwardly and pressed firmly against the inner sides of the clamping member 22, and more or less into the annular grooves thereof. Hereupon the nozzle 27 of the pump hose 28 is removed from the passage 17, and the screw plug 18 replaced and the passage 17 firmly sealed.

The wall portion 14 having become circumferentially enlarged and deformed will retain its form, and hold the portion of the hose 21 thereon firmly clamped against the inner sides of the clamping members 22, and into the grooves 25 thereof, and at the same time form a fluid-tight joint between the outer side of the wall portion 14 and the inner side of the hose end 21.

It is to be noted that while the liquid in the space between the tubular member 10 and the distensible wall portion 14 thereof serves to reinforce the latter and assist in holding said wall portion 14 to its deformed or enlarged shape, that it is not necessary to maintain said space thereafter filled with fluid since it is impossible for the distended or bulged portion of said wall portion 14 to return to, or resume its initial form. The wall portion once having been distended uniformly and taken a set cannot, therefore, resume or be caused to resume its original form.

It is to be further noted that in our coupling all possibility of the end of the hose becoming buckled or crimped is avoided, as is the case where the clamping pressure is exerted upon the outer side of the hose which tends to reduce its wall thickness and increase its diameter and circumference, and as a result weaken the same where such crimping occurs, since in our construction the action is the reverse; i. e. the pressure is exerted upon the inner side of the hose, and its wall thickness reduced without increasing the external diameter or circumference thereof due to the limiting effect of the clamping members 22 unyieldingly engaging the outer side of the hose.

While we have shown our coupling as applied to a high pressure hose, it will, of course, be understood that it is not limited thereto, and that the same may be applied to hose of all types, and for all purposes in which a fluid-tight connection or joint is required between two adjoining hose ends, or other parts or members.

Having thus described our said invention, what we claim and desire to secure by Letters Patent is:

1. A coupling of the character described comprising a rigid outer tubular member, a rigid inner tubular member, and a deformable tubular member on said rigid inner member adapted to receive the end of a hose; said deformable member, when annularly expanded, serving to press the portion of the hose thereon against said outer tubular member to effect a fluid tight joint between the parts.

2. A coupling of the character described comprising a rigid outer tubular member, a rigid inner tubular member, and a distensible tubular member disposed in annularly spaced relation to said inner tubular member and secured at its ends thereto and adapted to receive the end of a hose; said distensible member cooperating with said outer rigid member to clamp the hose therebetween.

3. A coupling of the character described comprising a receptacle including a tubular member having attaching means at one end, and cooperating clamping means surrounding said receptacle; the outer wall of said receptacle being adapted to receive thereon the end of a hose, and to be expanded outwardly to force the hose into firm engagement with said clamping means.

4. A coupling of the character described comprising inner and outer portions forming a chamber therebetween, a hose embracing said outer portion, and clamping means embracing the portion of said hose engaging said outer portion; said outer portion being expanded to firmly grip the hose between the same and said clamping means.

5. A coupling of the character described comprising a tubular member, a yielding annular outer wall member arranged in spaced relation to and surrounding the same and forming therewith an annular receptacle at one end thereof; said outer wall member being adapted to receive the end of a hose, and clamping means cooperating with said yielding wall member and embracing the end of said hose therebetween.

6. A coupling of the character described comprising a distensible tubular member disposed in annularly spaced relation to one end of a tubular member and secured at its ends thereto and adapted to receive the end of a hose, and clamping means surrounding said hose and cooperating with said distensible member to clamp the hose therebetween.

7. A coupling of the character described comprising a tubular member, a yielding annular wall member disposed at one end thereof adapted to receive the end of a hose; said yielding wall member being adapted to be distended outwardly and retain its distended form, and clamping means cooperating with said yielding wall member to clamp the end of said hose therebetween.

8. A coupling of the character described comprising a tubular member having attaching means thereon, a distensible wall member of greater diameter than said tubular member surrounding the same and secured at its opposite ends to said tubular member and forming an annular receptacle adapted to receive thereon the end of a hose, and clamping means embracing the end of said hose; said distensible wall member being adapted to be distended under pressure produced within said annular receptacle and cooperate with said clamping means to compress the end of the hose intermediate the same to form a fluid tight joint.

9. A coupling of the character described comprising a rigid tubular member, a yielding tubular member secured at one end thereof forming therewith an annular receptacle adapted to receive the end of a hose, and sectional clamping means embracing the end of said hose, said yielding outer wall member being secured at its opposite ends to said tubular member, and its intermediate portion adapted to be distended under pressure produced within said annular receptacle whereby to force the same outwardly and compress said hose end between said yielding tubular member and said clamping means.

10. A coupling of the character described comprising a rigid tubular member, a yielding tubular wall member surrounding the same at one end thereof and forming therewith an annular receptacle adapted to receive the end of a hose thereon, and sectional clamping means having interengaging edges, means for securing said clamping means together and in embracing engagement with the end of said hose; said yielding outer wall member secured at its opposite ends to said tubular member and having its intermediate portion free and adapted to be distended under pressure produced within said receptacle and to retain its distended form whereby to compress said hose end circumferentially intermediate said tubular member and said clamping means.

11. A coupling of the character described comprising a rigid tubular member, a yielding tubular wall member surrounding the same and forming an annular receptacle at one end thereof adapted to receive thereon the end of a hose, sectional clamping means having interengaging edges, means for securing said clamping means together and in embracing engagement with the end of said hose; said annular receptacle having its outer wall member formed of ductile metal and secured at its opposite ends to said tubular member and having its intermediate portion free and adapted to be distended under pressure produced within said receptacle and retain its distended form whereby to compresss said hose end circumferentially intermediate said tubular member and said clamping means, an inlet and an outlet communicating with said annular receptacle, and means for sealing said inlet and outlet.

12. A coupling of the character described comprising a rigid tubular member, a collar thereon, and a screw-threaded portion below said collar, a tubular member of ductile metal surrounding said rigid tubular member and spaced annularly with respect thereto and secured at one end to one end of said rigid tubular member, and at its other end to said collar, said second-named tubular member being adapted to receive the end of a hose, sectional clamping means having interengaging edges, means for securing said clamping means together and in embracing engagement with the end of said hose; said second-named tubular member having its free intermediate portion adapted to be distended under pressure produced within the space between said first and second named tubular members and to retain its distended form whereby to compress said hose end circumferentially intermediate said second-named tubular member and said clamping means, an inlet and an outlet in said collar communicating with the annular space between said first and second-named tubular members, and means for sealing said inlet and outlet.

13. A coupling of the character described comprising a tubular member adapted to receive the end of a hose, an annular, deformable portion secured at its ends to said tubular member and engageable with said hose, and clamping means cooperating with said deformable member, when expanded, to embrace therebetween the end of the hose.

14. A coupling of the character described comprising a tubular member, an annular, deformable member secured at its opposite ends to said tubular member and engageable with the interior of a hose end, and clamping means cooperating with said deformable member and embracing the exterior of said hose end; said deformable member having its intermediate portion distended to force the adjacent portion of the said hose end into intimate contact with the interior of said clamping member.

15. A coupling of the character described comprising a tubular member adapted to receive the end of the hose, a deformable, cylindrical member engageable with said hose end; said deformable member having its opposite ends secured to said tubular member, and its intermediate portion free therefrom, and clamping means embracing said end of the hose in surrounding relation to said deformable member to secure the hose end therebetween.

16. A coupling of the character described comprising a tubular member adapted to receive the end of a hose, a deformable, cylindrical member engageable with said hose end; said deformable member having its opposite ends secured to said tubular member, and its intermediate portion distended to a greater degree than its end portions.

ROBERT D. McELHANY.
JAMES BORROWMAN.